Patented Nov. 24, 1953

2,660,549

UNITED STATES PATENT OFFICE 2,660,549

THERAPEUTIC GOLD-DIMERCAPTO REACTION PRODUCT

Ernst A. H. Friedheim, New York, N. Y.

No Drawing. Application July 13, 1948,
Serial No. 38,545

7 Claims. (Cl. 167—68)

1

This invention relates to new and improved therapeutically active gold compounds and has particular relation to new gold compounds of low toxicity, in which the Au-atom is linked to S-atoms of organic dimercapto-compounds of the type described hereinafter. The invention also relates to a process for preparing such compounds.

It has been known that gold compounds may be obtained by adding an aqueous solution of 2,3-dimercaptopropanol to an aqueous solution of gold sodium thiosulfate or gold sodium thiomalate. The reaction product which is formed as a heavy yellow precipitate and is insoluble in water, dilute HCl or NaOH, alcohol and ether, is a 2,3-dimercaptopropanol-gold compound containing two atoms of gold per molecule of 2,3-dimercaptopropanol.

In contrast to these compounds, the main object of the present invention is the preparation of new gold compounds which can be dissolved to injectable solutions and contain radicals of 2,3-dimercapto propanol, or other organic dimercapto compounds.

Another object of my invention is the preparation of an isolated gold compound which is soluble in water, methanol, ethanol, acetone, propylene glycol and methyl acetamide, and contains radicals of 2 mols of 2,3-dimercaptopropanol for one atom of gold in the molecule.

It is also an object of this invention to provide an injectable gold-containing solution of low toxicity, by reacting a solution of a trivalent or monovalent gold compound with at least one mol of 2,3-dimercapto propanol or another organic dimercapto compound, at a suitable pH.

A further object of my invention consists in the detoxification of therapeutically active gold compounds by adding to the solution of the latter 2,3-dimercaptopropanol or other organic dimercapto compounds at a pH specified hereinafter.

Other objects and the advantages of the invention will be apparent from the following specification and claims and the examples which illustrate some preferred embodiments of my invention.

I have found that the reaction between an inorganic gold compound, such as H(AuCl4).4H2O, or gold thiosulfate, with 2,3-dimercapto propanol under certain conditions, forming part of the present invention, including a pH greater than 7 and preferably 9–11, leads to injectable solutions of compounds containing in the molecule radicals of 2,3-dimercapto propanol and gold, in

2 a form where the gold is of significantly reduced toxicity. Such injectable solutions may be prepared by carrying out the reaction in water or in injectable organic solvents, such as propylene glycol or methyl acetamide and adjusting the resulting solution to a substantially neutral or slightly alkaline reaction.

A similar detoxifying effect is observed when organic gold compounds of the type of gold thiomalate or gold thio glucose are reacted with 2,3-dimercapto propanol in accordance with the present invention, and also in the reaction of 2,3-dimercapto propanol with organic gold compounds where the gold is linked to a carbon atom, such as in gold diethyl bromide.

From a solution prepared by the reaction of H(AuCl4).4H2O and 2,3-dimercapto propanol in alkaline medium, a gold compound can be isolated, which contains two 2,3-dimercapto propanol radicals for one atom of gold. This new compound, being part of the present invention, is soluble in water, physiological salt solution, alcohol, and injectable organic liquids, such as propylene glycol and methyl acetamide.

*Example 1.—Preparation of an injectable aqueous gold solution*

41.2 gr. of acid gold chloride (AuCl3.HCl.4H2O) dissolved in 600 ml. of normal aqueous sodium hydroxide are run in a thin stream with mechanical stirring into a mixture of 26 gr. of 2,3-dimercapto propanol and 1.3 l. of water. A brownish precipitate is formed which redissolves on stirring. The resulting clear orange colored solution is adjusted by addition of acid, such as dilute hydrochloric acid, acetic acid or CO2 to a pH of 7.8. After standing at room temperature for three days, the solution is filtered from a small amount of insoluble material and made up with distilled water to contain 10 gr. of gold metal per liter. The solution may be sterilized by filtration through a bacterial filter and dispensed for medical use.

Instead of running the gold solution into the 2,3-dimercapto propanol suspension, the suspension may be added to said solution.

*Example 2.—Isolation of a gold compound*

One liter of the gold solution obtained according to Example 1, is evaporated in vacuo to dryness. The residue, containing an orange colored gold compound and inorganic salts, is leached with 300 ml. of acetone, the orange colored acetone solution is filtered from the insoluble material and evaporated in vacuo to dryness. The resulting residue, representing a gold-2,3-dimercapto propanol compound, presents itself as a highly viscous and hygroscopic syrup which solidifies, when completely dried, at minus 5° Celsius. It is soluble in water, methanol, ethanol, acetone, propylene glycol, methyl acetamide; insoluble in ether and carbon tetrachloride. On acidification with acetic acid, and more rapidly with hydrochloric acid, the aqueous solution forms a yellow orange precipitate.

*Example 3*

A solution of 215 mg. (0.52 millimol) of $AuCl_3 \cdot HCl \cdot 4H_2O$ in 5 cc. of water is poured into a solution of 144 mg. (1.04 millimols) of 2,3-dimercaptopropionic acid in 5 cc. of water. A flocculent brown precipitate is formed, which dissolves upon the addition of 221 mg. (2.08 millimols) of $Na_2CO_3$ to a clear solution of pH=7. The compound thus formed may be obtained in solid form by evaporation of the solution to dryness under vacuum. On acidification with mineral acid, concentrated aqueous solutions of this compound yield a yellow precipitate. The compound is insoluble in ether and chloroform.

*Example 4*

The pH of an aqueous solution containing one mol of gold thiomalate is adjusted to a pH value of 9.0 by the addition of $Na_2CO_3$. To the resulting solution 1.2 mols of 2,3-dimercapto propanol are added. The toxicity of the solution thus obtained is considerably lower than that of the starting solution, referred to equal gold concentrations.

An aqueous solution of gold thioglucose may be detoxified substantially in the same manner.

In alkaline aqueous solution, the reaction product of Example 1 or 2 gives a positive thiol reaction with sodium nitroprusside. The isolated material according to Example 2 contains 44% of gold, corresponding to one atom gold for 2 molecules of 2,3-dimercapto propanol. Without committing myself to any theory or formula, this would indicate that this compound contains the gold substantially in trivalent form, for example, corresponding to the formula

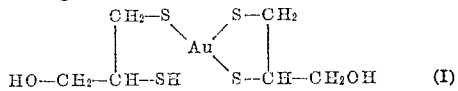

$$\text{HO}-CH_2-CH-SH \quad S-CH-CH_2OH \quad \text{(I)}$$

The compound isolated according to Example 2 is stable to heat, as it remains unchanged by heating for one hour at 117° C.

The molecular proportions of $H(AuCl_4) \cdot 4H_2O$ and 2,3-dimercapto propanol may be varied in the reaction described in Example 1 within wide limits. In particular the relative quantities of 2,3-dimercaptopropanol may be increased to 3 mols per atom of gold without changing significantly the course of the reaction or the nature of the reaction product and it is not intended to limit the scope of the invention to the proportions indicated in the above examples.

In preparing the compounds according to the invention, it is essential that the reaction be carried out at a pH superior to 7 and preferably at a pH of 9 to 11.

Preparations obtained according to the present invention have been given routinely to 30 patients as the dose corresponding to 50 mg. of gold daily for 10 days without any untoward effect whatsoever. Blood examinations revealed no damage to the hematopoietic system.

It will be understood that the present invention is not restricted to the specific substances and specific steps described above and may be carried out with various modifications. For example, instead of the $AuCl_3 \cdot HCl \cdot 4H_2O$, other gold compounds such as $Na(AuCl_4) \cdot 2H_2O$, $HAuBr_4$, $KAuBr_4$, $NH_4AuCl_4$, may be used, the pH of the reaction mixture may be adjusted by means of KOH, $Na_2CO_3$, $K_2CO_3$ or diethylamine, and the reaction may be carried out in an organic solvent, such as propylene glycol or methyl acetamide, which may contain some water. The preferred dithiol used in carrying out the invention is 2,3-dimercaptopropanol, but 2,3-dimercapto-propionic acid, 2,3-dimercaptopropyl ethyl ether, and other dithiols of aliphatic or aromatic compounds, particularly aliphatic or aromatic orthodithiols may also be used. Furthermore, the gold compound, the dimercapto-compound and the substances used for obtaining the desired pH, may be added simultaneously, or one after the other, preferably under stirring, to the reaction medium in order to obtain a solution or composition embodying my invention, but the preferred form of the invention consists in mixing a neutral or alkaline gold solution with a neutral or alkaline solution of the organic dimercapto compound. These and other modifications may be made without departing from the scope of the invention, as defined in the appended claims.

It is to be understood that in the present specification and claims the term "organic dimercapto compound" is used to denote compounds of the formula $R=(SH)_2$, in which R may be any organic radical, and the two —SH groups are linked to C atoms of the organic radicals.

The compounds and compositions according to the present invention may be used in combating various diseases and they are particularly useful in the treatment of rheumatoid arthritis.

What I claim is:

1. A therapeutically active reaction product of a soluble gold compound and an organic dimercapto compound selected from the group consisting of 2,3-dimercaptopropanol, 2,3-dimercaptopropionic acid, and dimercaptopropyl ethyl ether, said reaction product being soluble in water and propylene glycol, containing in the molecule two radicals of the dimercapto compound for 1 atom of gold and being obtained by reacting at least two mols of the dimercapto compound with one atom of gold at a pH higher than 7.

2. A therapeutically active reaction product of a soluble gold compound and 2,3-dimercaptopropanol, said reaction product being soluble in water and propylene glycol, containing in the molecule two 2,3-dimercaptopropanol radicals for 1 atom of gold and being obtained by reacting at least two mols of 2,3-dimercaptopropanol with one atom of gold at a pH higher than 7.

3. A therapeutically active reaction product of a soluble gold compound and 2,3-dimercaptopropionic acid, said reaction product being soluble in water and propylene glycol, containing in the molecule two 2,3-dimercaptopropionic acid radicals for 1 atom of gold and being obtained by reacting at least two mols of 2,3-dimercaptopropionic acid with one atom of gold at a pH higher than 7.

4. A process for preparing a therapeutically active gold compound, comprising reacting the solution of a gold compound, at a pH higher than 7, for one atom of gold with at least 2 mols of an organic dimercapto compound selected from the group of 2,3-dimercaptopropanol, 2,3-dimercaptopropionic acid and 2,3-dimercaptopropyl ethyl ether.

5. A process for preparing a therapeutically active gold compound, comprising reacting the solution of a trivalent gold compound, at a pH higher than 7, with about 2 mols of 2,3-dimercaptopropanol for one atom of gold.

6. A process for preparing a therapeutically active gold compound, comprising reacting the solution of a trivalent gold compound at a pH higher than 7, with about 2 mols of 2,3-dimercaptopropionic acid for one atom of gold.

7. A therapeutically active solution in a solvent selected from the group consisting of water and propylene glycol, of the reaction product of a gold compound with an organic dimercapto compound selected from the group consisting of 2,3-dimercaptopropanol, 2,3 - dimercaptopropionic acid, and dimercaptopropyl ethyl ether, said reaction product containing in the molecule two radicals of the dimercapto compound for 1 atom gold and being obtained by reacting at least two mols of the dimercapto compound with one atom of gold at a pH higher than 7.

ERNST A. H. FRIEDHEIM.

References Cited in the file of this patent

UNITED STATES PATENTS

| Number | Name | Date |
|---|---|---|
| 1,663,390 | Schoeller et al. | Mar. 20, 1928 |
| 2,008,252 | Jostes | July 16, 1935 |
| 2,049,198 | Delange | July 28, 1936 |
| 2,352,124 | Sabin et al. | June 20, 1944 |
| 2,422,246 | Lazier et al. | June 17, 1947 |

OTHER REFERENCES

Carius: "Annalen der Chemie und Pharmacie," volume 124, (1862), pages 231 to 234.

Ray: "Journal Chem. Soc. (London)," volume 109 (1916), page 608.

Chem. Centralblatt, volume I, 1925, pages 488 to 489.

Chemical Abstracts, volume 40 (1946), columns 2792 to 2794.

Thompson et al.: Biochemical Journal, volume 41, October, 1947, pages 342–346.

Waters et al.: Science, December 14, 1945, volume 102, Number 2659, pages 601 to 606.

Kuzell et al.: Stanford Medical Bulletin, November, 1947, pages 197 to 202.

Wilson et al.: Journal Bact., October, 1947, volume 54, page 80.